Figures 1, 2:
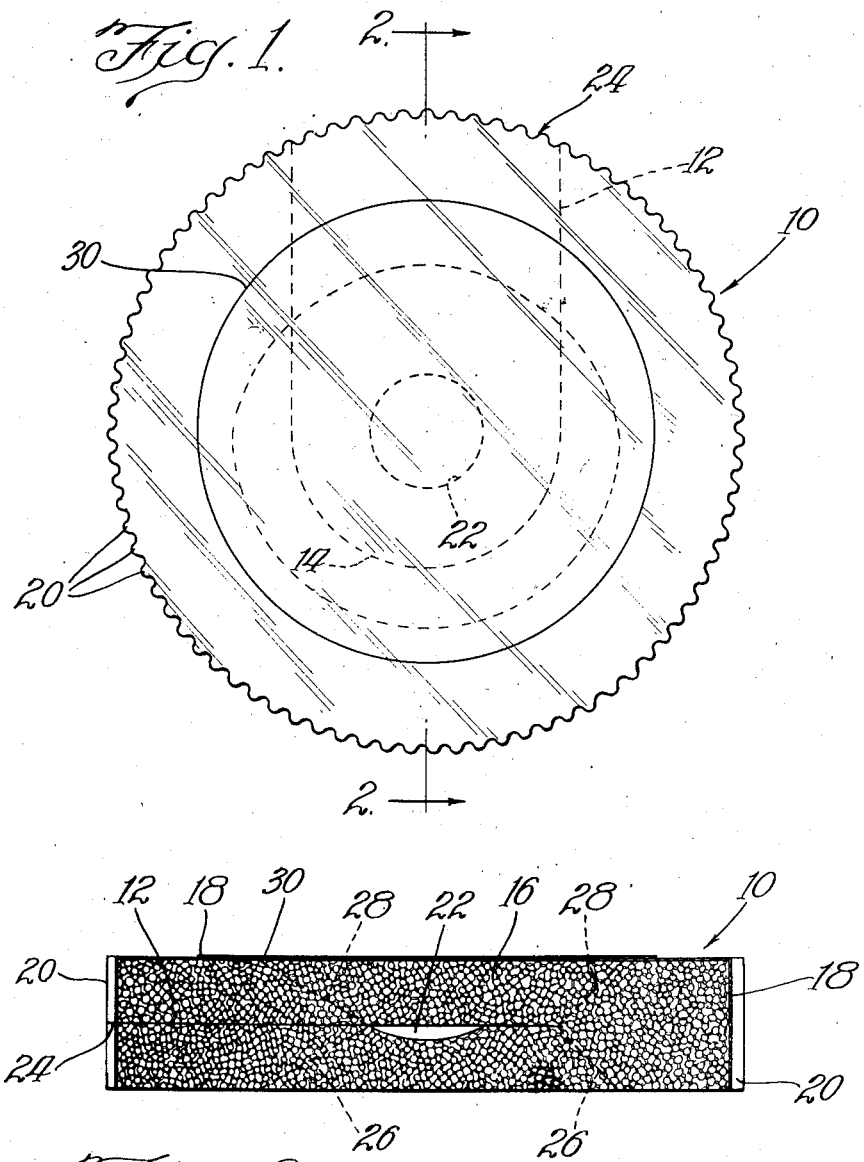

June 11, 1940.  C. E. ZIMMERMAN  2,204,203
APPLICATION OF COSMETICS
Filed Nov. 13, 1939

Inventor:
Charles E. Zimmerman
By: Freeman, Sweet, Albrecht & Newman
Attys.

Patented June 11, 1940

2,204,203

UNITED STATES PATENT OFFICE 2,204,203

APPLICATION OF COSMETICS

Charles E. Zimmerman, Chicago, Ill.

Application November 13, 1939, Serial No. 303,943

20 Claims. (Cl. 132—78.5)

My invention relates to a cosmetic applicator or compact and includes among its objects an advance and improvement in the facility with which a precisely controlled amount of powdered cosmetic may be applied. The invention is also an improvement upon the applicator or compact disclosed in United States Patent No. 2,176,831, granted to me October 17, 1939.

In the accompanying drawing:

Figure 1 is a top or plan view of an applicator or compact made in accordance with this invention; and Figure 2 is a section on the line 2—2 of Figure 1.

In the embodiment selected for illustration there is shown a compact in the form of a circular disc 10 having a diameter approximately five times the thickness of the disc. Substantially midway between its opposite faces the body of the compact is slitted by an suitable means for forming an interior kerf 12 for the reception of a powder of desired shade and quality, the inner end of said kerf having substantially the contour of the disc indicated by the dotted line 14 (Figure 1).

The compact is made of sheet latex rubber substantially devoid of filler. The body 16 has pores varying in size from microscopic up to a maximum of the order of magnitude of 0.0750 inch and a density ranging from 0.0018 to 0.0060 pounds per cubic inch, a density of 0.0040 having been found very satisfactory. Such a density provides the desired permeability to pulverulent materials to permit a precisely controlled application of powder to the skin of the user when the compact is filled and used as disclosed in my prior patent. Such a body has sufficient mechanical strength to stand on edge without a flattening of the edge through an angle of more than 40 degrees.

The body has a skin 18 of a thickness of the order of magnitude of eight thousandths of an inch, although shown exaggerated in the drawing, and the skin has relatively smaller pores than those of the body 16, which smaller pores make the skin 18 relatively impermeable to pulverulent materials but pervious to liquids and gases, thus facilitating cleansing of the compact.

As shown in Figure 2, the skin 18 extends over one flat peripheral surface and around the edge, leaving only one exposed surface having the greater porosity of the body portion, which exposed surface can advantageously be used to apply the powder contained in the compact to the skin of the user, as described in my prior patent. The smoother or skin surface of the compact may also be applied to the skin of the user if it is desired to spread the powder more evenly without adding additional powder thereto. Providing a skin around the edge of the compact as well as on one surface serves to retain the powder within the compact thus reducing waste and also provides another useful surface as will be described later.

The peripheral edge surface of the compact is corrugated or fluted as at 20, which not only improves the appearance of the compact but has certain functional advantages. The undulated surface thus provided can be used to remove any surplus powder that may inadvertently have been put on the skin of the user—that is, this surface, when applied to the skin of the user, acts as a brushing surface and removes any surplus powder. This brushing action on the skin of the user appears to be due in part at least to the corrugated skin surface of the compact which expands and contracts as it is applied to the skin of the user. This latter action also sets up slight air currents that assist in carrying off any surplus powder.

For certain uses, I may form a cavity 22 by removing material from the center of the body. This increases the amount of powder that can be stored, and also localizes the area from which the powder is liberated.

The mechanical reinforcement of the corrugated edge portion by the skin 18 assists in keeping the debouchment of the slit closed during ordinary use, and thus permits the use of a wider orifice at 24 than would otherwise be practicable.

By restricting the size of the end of the slit to such a contour as is indicated at 14, I am able to localize the area from which the powder will be liberated. The bulk of the powder will work out within an approximately conical space indicated in the drawing by the dotted lines at 26. The distortion of the parts will also cause powder to work toward the upper skin 18 inside the dotted lines 28 in Figure 2, but the rate of percolation toward the skin 18 will be only a fraction of the rate in the other direction because the breathing, or air movement, is slightly retarded by the skin 18 and the exit of power reaching the skin is strongly retarded, although not completely prevented.

Because, in ordinary use, compression of the body takes place near the center and in a direction directly toward and away from the charge of contained powder, the bulk of the powder will move as has been indicated. There is rarely, if ever, any radial compression of the edge, and compression of an edge portion in a vertical direction as viewed in Figure 2, as in grasping the compact, is of relatively little effect in causing movement of the powder. Therefore, even without a skin 18 around the edge, the edge portion will always be relatively free of powder.

In practice, after a period of prolonged use without washing, there is no part of the device in which minute traces of powder cannot be found, but the relative concentration will be as indicated, and the edge will practically always have so little powder in it that it is effective for removing powder already on the user's skin.

I have indicated at 30 a design applique similar to that disclosed in my copending application, Serial Number 301,892, filed October 30, 1939, which applique covers a greater area than the area defined by the lines 28, thus additionally reducing the liberation of powder from that area, as explained in greater detail in that application.

With or without a storage space 22, the end of the kerf 12 should extend far enough past the center of the device to enable the user to position a normal charge of powder with the main bulk of the charge at least central and preferably slightly past the center and remote from the debouchment at 24. In a compact four or five inches in diameter, for powdering the body after bathing, the concentric location of the kerf end illustrated in the drawing is satisfactory, and it is the large bath compact that has been selected for illustration. In smaller size compacts, such as the 2½" or 2" compacts commonly used to apply face powder, the slit 12 should be made a little wider, and the center of the kerf end at 12 can be offset a little below the center of the compact. This increases storage capacity without producing leakage through the orifice 24, and can be done without bringing the edge of the kerf at any point closer to the edge of the compact than 1¼ times the thickness of the compact, thus keeping the edge relatively free of powder during use.

Especially in the small compacts, the sinuous layer of relatively dense rubber covering the edge of the compact contributes materially to the mechanical strength of the portions defining the orifice 24 and thus makes it possible to employ a wider slit than would be practical without such reinforcements.

Without further elaboration the foregoing will so fully explain my invention that others may, by applying knowledge current at the time of application, readily adapt the same for use under various conditions of service.

I claim:

1. A cosmetic applicator comprising a pad-like body of porous latex rubber having pores of varying sizes; said pores communicating with one another and rendering the body pervious to pulverulent materials; said body having a skin formed on one side face and around the edge only; said skin being relatively impermeable to pulverulent materials, but permeable to liquids and gases.

2. A cosmetic applicator comprising a disc-like body of porous latex rubber having pores of varying sizes; said pores communicating with one another and rendering the body pervious to pulverulent materials; said body having a skin formed on one side face and around the edge only; said skin being relatively impermeable to pulverulent materials, but permeable to liquids and gases; said skin having a thickness of approximately eight thousandths of an inch.

3. A cosmetic applicator comprising a disc-like body of porous latex rubber having pores of varying sizes; said pores communicating with one another and rendering the body pervious to pulverulent materials; said body having a skin formed on one side face and around the edge only; said skin having pores smaller than the pores of the remainder of said body and being relatively impermeable to pulverulent materials, but permeable to liquids and gases.

4. An automatic compact comprising a flat substantially circular body of latex rubber, having high porosity and interconnecting pores, and a density of not more than 0.0060 pound per cubic inch; said body having sufficient mechanical strength to support its own weight on edge without material distortion, but being easily flexed on itself through 180° of folding without permanent change of its shape; said body having a thin reinforcing skin portion of greater density and strength than the remainder of said body; said skin portion covering the entire surface of said body except for one flat face; said body having a slit of a width not exceeding 50% of the average transverse dimension of its flat face, extending into the central portion of said body; said slit terminating with an end contour in general conformity with the contour of said body but at no point extending more than 50% of the distance from the center to the edge, and terminating along a line spaced from the adjacent edge by not less than 1.25 times the thickness of said body; said body being hollowed out substantially at the center by removal of material between said slit and the adjacent face devoid of skin; and a thin design applique layer overlying at least the central portion of the flat skin face of said body; said design layer extending farther from the body center than the terminal portion of said slit; the edge of said body having an undulating contour.

5. An automatic compact comprising a flat body of latex rubber, having high porosity and interconnecting pores; said body having sufficient mechanical strength to support its own weight on edge without material distortion, but being easily flexed on itself through 180° of folding without permanent change of its shape; said body having a thin reinforcing skin portion of greater density and strength than the remainder of said body; said skin portion covering the entire surface of said body except for one flat face; said body having a slit extending into the central portion of said body, the inner end of said slit terminating along a line spaced from the adjacent edge by not less than 1.25 times the thickness of said body; said body being hollowed out substantially at the center by removal of material between said slit and the adjacent face devoid of skin; and a thin design applique layer overlying at least the central portion of the flat skin face of said body; said design layer extending farther from the body center than the terminal portion of said slit; the edge of said body having an undulating contour.

6. An automatic compact comprising a flat body of latex rubber, having high porosity and interconnecting pores; said body having sufficient mechanical strength to support its own weight on edge, but being easily flexed on itself through 180° of folding without permanent change of its shape; said body having a thin reinforcing skin portion of greater density and strength than the remainder of said body; said skin portion covering the entire surface of said body except for one flat face; said body having a slit entering through said skin and extending into the central portion of said body; said slit terminating with an end contour along a line spaced from the adjacent edge; the edge of said body having an undulating contour.

7. An automatic compact comprising a flat body of latex rubber, having high porosity and interconnecting pores; said body having sufficient mechanical strength to support its own weight on edge, but being easily flexed on itself through 180° of folding without permanent change of its shape; said body having a thin reinforcing skin portion of greater density and strength than the remainder of said body; said skin portion covering the entire surface of said body except for one flat face; said body having a slit entering from the edge of said body and extending into the central portion of said body; said slit terminating with an end contour terminating along a line spaced from the adjacent edge; the edge of said body having an undulating contour.

8. An automatic compact comprising a flat body of latex rubber, having high porosity and interconnecting pores; said body having sufficient mechanical strength to support its own weight on edge, but being easily flexed on itself through 180° of folding without permanent change of its shape; said body having a thin reinforcing skin portion of greater density and strength than the remainder of said body; said skin portion covering the entire surface of said body except for one flat face; said body having a slit entering through said skin and extending into the central portion of said body; said slit terminating with an end contour spaced from the adjacent edge.

9. An automatic compact comprising a body of latex rubber having one flat surface; said body having a skin portion of relatively greater density and mechanical strength covering the remainder of the surface of said body; said body having a kerf entering through said skin portion; the inner end of said kerf being spaced from the place of entry and not less remote therefrom than to be concentric with the center of said body; the extreme edges of said kerf terminating short of the adjacent exposed body surface by not less than one and one quarter times the thickness of said body.

10. An automatic compact comprising a body of porous latex rubber having one flat surface; said body having an integral skin portion of relatively greater density and mechanical strength covering the remainder of the surface of said body; said body having a kerf entering through said skin portion; the inner end of said kerf being spaced from the place of entry and not less remote therefrom than to be concentric with the center of said body.

11. An automatic compact comprising a body of porous latex rubber having one flat surface and a corrugated edge portion encircling said flat surface; said body having a skin portion of relatively greater density and mechanical strength covering said edge portion; said body having a kerf entering through said edge portion and extending toward the center of said body; the portion of said kerf adjacent the center being enlarged to define a storage space.

12. An automatic compact comprising a body of porous latex rubber having one flat surface and an edge portion encircling said flat surface; said body having a skin portion of relatively greater density and mechanical strength covering said edge portion; said body having a kerf entering through said edge portion and extending toward the center of said body; the portion of said kerf adjacent the center being enlarged to define a storage space.

13. An automatic compact comprising a body of porous latex rubber having one flat surface and an edge portion encircling said flat surface; said body having a skin portion of relatively greater density and mechanical strength covering said edge portion; said body having a kerf entering through said edge portion and extending toward the center of said body.

14. An automatic compact comprising a flat substantially circular body of latex rubber having high porosity and interconnecting pores, and a density of not more than 0.0060 pound per cubic inch; said body having sufficient mechanical strength to support its own weight on edge without material distortion, but being easily flexed on itself through 180° of folding without permanent change of its shape; said body having a thin reinforcing skin portion of greater density and strength than the remainder of said body and covering the entire surface of said body except for one flat face; said body having a slit of a width not exceeding 50% of the average transverse dimension of its flat face, extending into the central portion of said body; said slit terminating with an end contour in general conformity with the contour of said body but at no point extending more than 50% of the distance from the center to the edge, and terminating along a line spaced from the adjacent edge by not less than 1.25 times the thickness of said body; said body being hollowed out substantially at the center by removal of material between said slit and the adjacent face devoid of skin; and a thin design applique layer overlying at least the central portion of the flat skin face of said body and extending farther from the body center than the terminal portion of said slit.

15. An automatic compact comprising a flat body of latex rubber having high porosity and interconnecting pores; said body having sufficient mechanical strength to support its own weight on edge without material distortion, but being easily flexed on itself through 180° of folding without permanent change of its shape; said body having a thin integral reinforcing skin portion of greater density and strength than the remainder of said body and covering the entire surface of said body except for one flat face; said body having a slit extending into the central portion of said body, the inner end of said slit terminating along a line spaced from the adjacent edge by not less than 1.25 times the thickness of said body; said body being hollowed out substantially at the center by removal of material between said slit and the adjacent face devoid of skin; and a thin design applique layer overlying at least the central portion of the flat skin face of said body and extending farther from the body center than the terminal portion of said slit.

16. As a new article of manufacture, an automatic compact designed for use in applying cosmetic powder, and comprising a pad-like body formed of porous latex rubber with minute communicating pores, and embodying on one side face and the edge or peripheral portion thereof but not on the other side face an integral reinforcing skin permeable to powder but impermeable to liquids and gases, said body also embodying a normally closed kerf leading into the central portion of its interior and forming a pocket for a charge of powder.

17. As a new article of manufacture, an automatic compact designed for use in applying cosmetic powder, and comprising a pad-like body formed of porous latex rubber with minute communicating pores, and embodying on one side face and the edge or peripheral portion thereof but not on the other side face an integral reinforcing skin permeable to powder but impermeable to liquids and gases, said body also embodying a normally closed kerf leading inwardly from the edge or peripheral portion thereof and terminating in the central portion of the body in an enlarged pocket for a charge of cosmetic powder.

18. As a new article of manufacture, an automatic compact designed for use in applying cosmetic powder and comprising a pad-like body having flat side faces and an undulatory edge or peripheral portion and formed of latex rubber with minute communicating pores therein, said body having on one side face thereof and its edge or peripheral portion but not on its other side face an integral skin impermeable to powder but permeable to gases and liquids, and also embodying a normally closed slit leading into its interior and forming a pocket for a charge of powder.

19. As a new article of manufacture, an applicator adapted for use in applying cosmetic powder and comprising a pad-like body having flat side faces and an undulatory edge or peripheral portion and formed of rubber material with minute communicating pores therein, said body having on one side face thereof and its undulatory edge or peripheral portion but not on its other side face an integral reinforcing skin of greater density and strength than the remainder of the body.

20. As a new article of manufacture, a cosmetic applicator comprising a pad-like body having flat side faces and an undulatory edge or peripheral portion and formed of latex rubber with minute communicating pores therein, said body having on one side face thereof and its undulatory edge or peripheral portion but not on its other face an integral skin impermeable to powder but permeable to gases and liquids.

CHARLES E. ZIMMERMAN.